United States Patent [19]

Hughes, Jr. et al.

[11] 3,751,171
[45] Aug. 7, 1973

[54] APPARATUS FOR ADAPTING A SPECTROPHOTOMETER TO PERFORM THE FUNCTION OF A DENSITOMETER

[76] Inventors: Elvin Hughes, Jr., 3550 Nicholson Dr., No. 2083, Baton Rouge, La. 70802; Robert V. Nauman, 864 Diron Cir., Baton Rouge, La. 70810

[22] Filed: Jan. 5, 1971

[21] Appl. No.: 104,030

[52] U.S. Cl. .................... 356/244, 356/96, 356/203
[51] Int. Cl. .......................................... G01n 21/16
[58] Field of Search ................. 356/202, 244, 203, 356/38, 175, 96, 97

[56] References Cited
UNITED STATES PATENTS
3,600,099  8/1971  Schoeffel .......................... 356/203

OTHER PUBLICATIONS

Shimadru Spectrophotometer Model QV-50 American Instrument Co., Inc.; Copy received Dec. 2, 1968; p. 23.

*Primary Examiner*—Ronald L. Wibert
*Assistant Examiner*—V. P. McGraw
*Attorney*—David L. Ray

[57] ABSTRACT

A lightweight, inexpensive device for adapting a spectrophotometer to perform the functions of a densitometer, including means for directing the light source from a spectrophotometer through a photographic plate, and means for moving the photographic plate across the beam of light.

8 Claims, 7 Drawing Figures

PATENTED AUG 7 1973
3,751,171
SHEET 1 OF 2
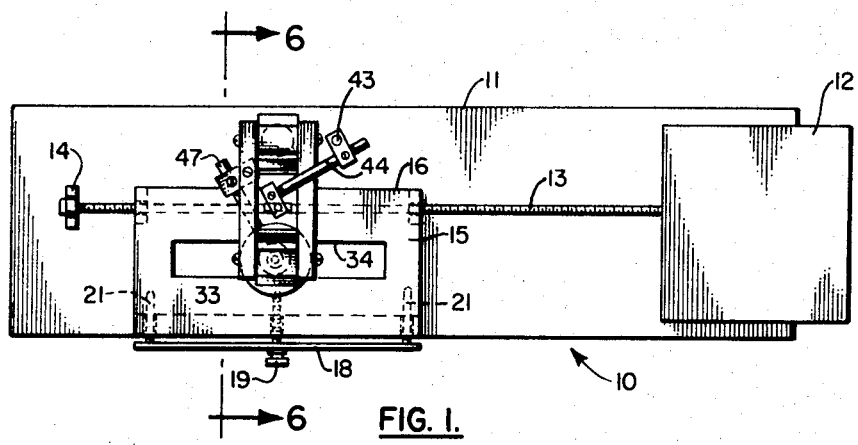
FIG. 1.
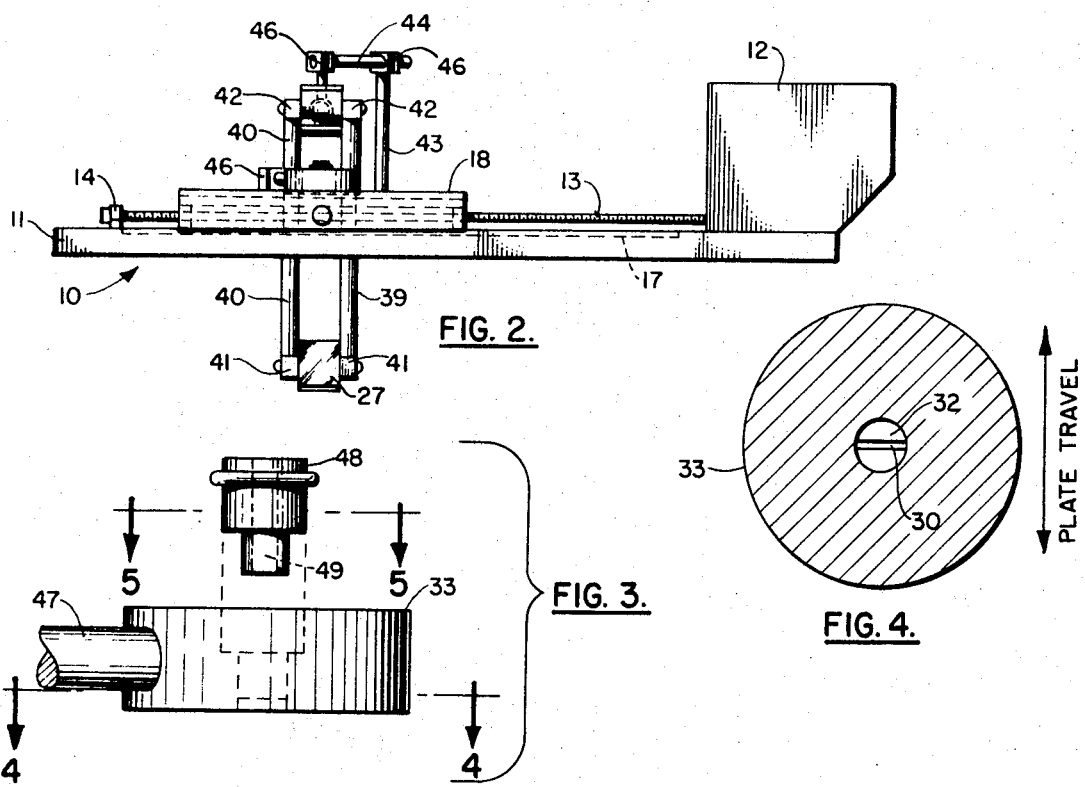
FIG. 2.
FIG. 3.
FIG. 4.
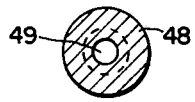
FIG. 5.
INVENTORS
ELVIN HUGHES
ROBERT V. NAUMAN
BY David L. Ray
ATTORNEY

INVENTORS
ELVIN HUGHES
ROBERT V. NAUMAN

BY David L. Ray
ATTORNEY

APPARATUS FOR ADAPTING A SPECTROPHOTOMETER TO PERFORM THE FUNCTION OF A DENSITOMETER

BACKGROUND OF THE INVENTION

The present invention relates to a device for adapting or converting a spectrophotometer to perform the functions of a densitometer. It is well known that a spectrophotometer is an instrument which measures and records the intensity of light which has been transmitted through a non-opaque sample.

A spectrophotometer consists of a light source, a sample cell, a monochromator, a detector, and a recorder. The light source provides a beam of light which is directed through a sample before or after passing through a monochromator which divides a polychromatic beam into a nearly monochromatic beam. The monochromator can be tuned to allow passage of a specific wave length of light for analyzing various colored substances. The light passing through the sample is directed to a detector. The detector provides a continuous output signal which is a function of the absorbance of the particular wave length of the light by the sample. The recorder receives the signal from the detector and gives a continuous record thereof.

It is also well known in the art that a densitometer is an instrument for analyzing the densities of spectrum lines, or any other blackening, which have been recorded on a photographic plate or film by a spectrograph or other similar instrument. A densitometer contains elements similar to those of a spectrophotometer. In a densitometer the photographic plate is analogous to the sample in the spectrophotometer. The densitometer usually does not have a monochromator, but does contain most of the other elements of a spectrophotometer. In addition, a densitometer contains a slit mechanism which concentrates the light beam on a narrow portion of the photographic plate, and means for moving the photographic plate across the light source.

Most academic institutions and chemical plants have a spectrophotometer and a spectrograph in their laboratories. To obtain the desired information from the photographic plate in an easy and accurate manner, a densitometer is needed. Densitometers, however, are very expensive instruments and many academic institutions and chemcial plants cannot afford to have one at their disposal.

U. S. Pat. Nos. 2,656,757 and 3,344,702 disclose various mechanisms for moving a sample past a light source, but they do not disclose any of the other features of the present invention.

The object of the present invention is to provide a low-cost mechanism for converting or adapting a spectrophotometer to perform the functions of a densitometer.

THE INVENTION

The densitometer adapter of the present invention includes means for directing light from a spectrophotometer's light source through a photographic plate and into the detector of the spectrophotometer, and means for moving the photographic plate across the light source.

The various objects and features of the present invention will become apparent to those skilled in the art in the following description of the preferred embodiments of the invention as illustrated in the accompanying sheets of drawing in which:

FIG. 1 shows a top view of the densitometer adapter of the present invention;

FIG. 2 shows a side view of the densitometer of the present invention;

FIG. 3 shows a partly sectional view of the focusing slit holder and focusing ring;

FIG. 4 shows a partly sectional view taken along lines 4—4 of FIG. 3;

FIG. 5 is a partly sectional view taken along lines 5—5 of FIG. 3;

Figure 6:
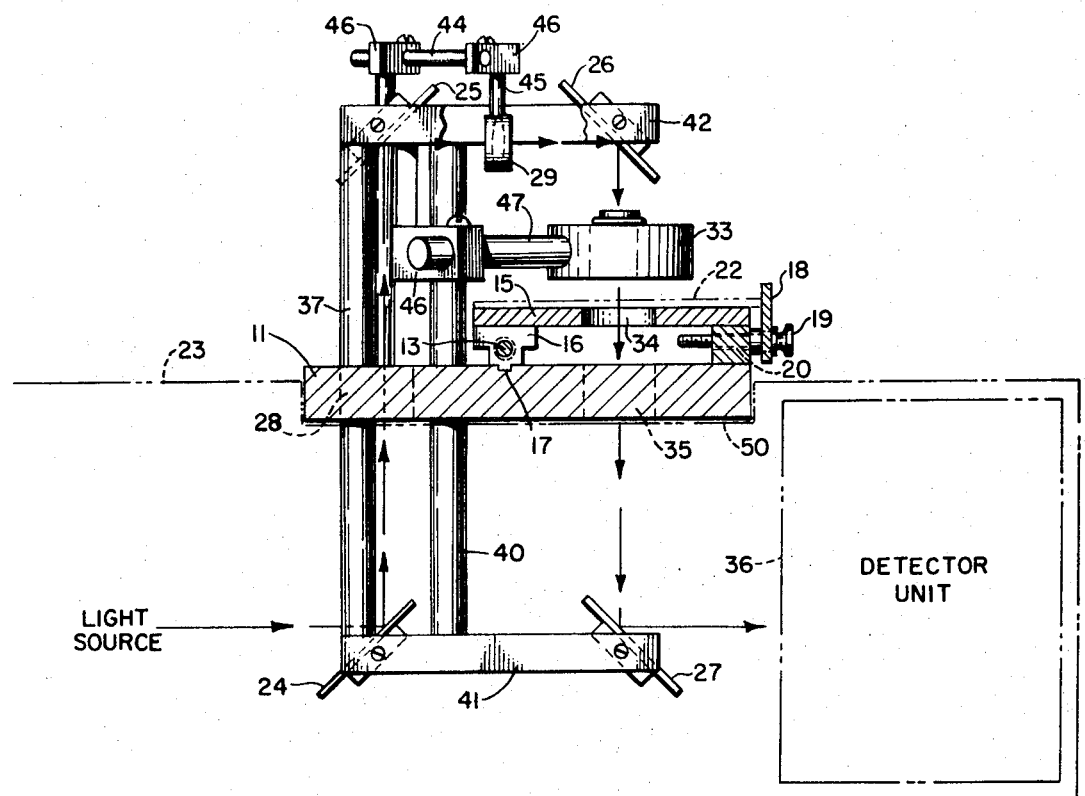
FIG. 6 is a partly sectional side view of the densitometer adapter inserted into the sample chamber of a spectrophotometer taken along lines 6—6 of FIG. 1.

Referring now to the drawings, FIGS. 1 and 2 show a top view and a side view of the assembled densitometer adapter 10 of the present invention. The densitometer adapter includes a base 11 which may be made of metal or any other suitable material. Mounted upon the base is an electric motor 12 which drives a threaded screw 13. The screw 13 is connected at one end to motor 12 and at its other end to a bearing 14.

Figure 7:
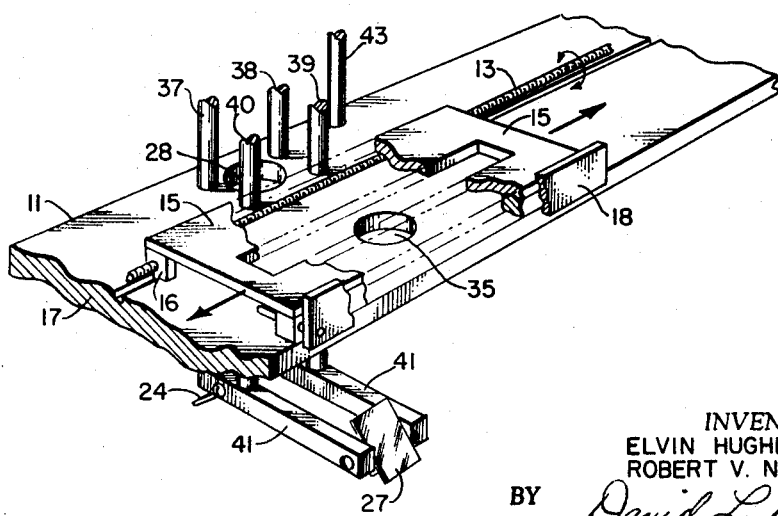
FIG. 7 is a partly sectional top view of the base and photographic plate platform of the present invention.

As can be seen in FIGS. 1, 2 and 7, photographic plate platform 15 is movably attached to base 11 by means of threaded guides 16 attached to the bottom of platform 15. The guides 16 engage screw 13 and cause the platform to move across base 11 when screw 13 is rotated. Guides 16 travel in groove 17 beneath screw 13 as the screw is turned by motor 12. The guides 16 are attached to photographic plate platform 15 by any suitable means such as welding, screwing and the like, or guides 16 may be cast integrally with photographic plate platform 15.

Photographic plate platform 15 has attached to one side thereof a transverse adjusting plate 18 for positioning the photographic plate or film transversely with respect to the direction of movement of platform 15. The adjusting plate 18 has an adjustment screw 19 as can be seen in FIGS. 1 and 2. Screw 19 has a threaded portion which extends into a threaded slot 20 in the base of photographic platform 15 as can be seen in FIG. 6. The transverse adjustment plate 18 has guides 21 which fit into slots in photographic plate platform 15 to securely position plate 18 relative to platform 15. As can be seen in FIG. 6, the photographic plate 22 rests upon photographic plate platform 15 and against the transverse adjustment plate 18. By turning the transverse adjustment screw 19, transverse adjustment plate 18 can be made to move in a direction transverse to the direction of movement of that of photographic plate platform 15, thereby moving the photographic plate in the same direction.

Referring again to FIG. 6, it can be seen that the portion of the densitometer adapter below base 11 fits into the sample section 52 of the spectrophotometer 23. Base 11 has attached thereto four mirrors 24, 25, 26 and 27, which change the direction of the light beam coming from the spectrophotometer so that the light beam passes through the photographic plate 22 and them back into the spectrophotometer. The light beam is emitted from the light source of the spectrophotometer 23 and impinges upon miror 24. Mirror 24 reflects the light source upward through base aperture 28 and onto mirror 25. Mirror 25 reflects the light beam through lens 29 and onto mirror 26. Mirror 26 reflects the light source down through a narrow aperture 30 formed by slit 32, as seen in FIG. 4. The small slit 32 is contained in a slit holder 33 as seen in FIGS. 3, 4 and 6. The light source also passes through the photographic plate platform aperture 34 as seen in FIGS. 1 and 6 and through the base aperture 35. The light source is then reflected by mirror 27 and directed to spectrophotometer detector unit 36. The detector unit sends a signal to a recorder (not shown) which records the information detected.

The mirrors 24, 25, 26 and 27 are attached to the base 11 by means of mirror-holding legs 37, 38, 39 and 40, lower mirror holder arms 41, and upper mirror holder arms 42, as seen in FIGS. 2, 6 and 7. The mirrors may be fastened to the arms by any suitable means such as welding, glueing, screwing or the like. The mirrors are preferably pivotably attached to the arms so that they may be adjusted to vary the direction of the light beam.

The lens 29, as seen in FIGS. 1, 2 and 6, is attached to the base 11 by means of a lens support leg 43, lens support arm 44, and lens support 45, although any other adjustable attachment means are suitable. Adjusting means 46 are located between the lens support members 43, 44 and 45 so that the position of the lens may be varied. The adjusting means 46 permits the various members to be rotated relative to the other various members for precise positioning of lens 29. The adjusting means may comprise generally square members with holes therein to receive the support members, and with tightening screws to contain the support members securely within the adjusting means 46. Many other well-known means for adjusting the members may also be employed.

The slit holder 33 shown in FIGS. 1, 3, 4 and 6 is attached to mirror-holding leg 40 by adjusting means 46 which functions as previously described. The slit is attached to the adjusting means 46 by arm 47. The slit holder 33 is a cylinder as seen in FIGS. 3 and 4 which has an aperture therein for receipt of focusing ring 48. As seen in FIG. 4, the slit holder 33 has a focusing slit 32 in the bottom thereof with slit aperture 30. The light beam, as seen in FIG. 6, is directed through the hole 49 in focusing ring 48, down into slit holder 32, and through slit aperture 30.

A sectional view of ring holder 48 can be seen in FIG. 5. The ring holder 48 has cylindrical hole 49 in the center thereof for transmission of the light source to the aperture 30. The focusing slit narrows and focuses the light beam so that minute areas of the photographic plate or other sample may be scanned.

The densitometer adapter of the present invention is operated by inserting the densitometer adapter into the sample chamber of a spectrophotometer so that the mirrors therein are aligned in a plane intersecting the direction of travel of the light source of the spectrophotometer, as indicated in FIG. 6. The light from the spectrophotometer impinges upon mirror 24 and is reflected 90 degrees upward through base aperture 28 and onward to mirror 25. The light impinges upon mirror 25 and is reflected 90 degrees toward lens 29. The light beam passes through lens 29 and onto mirror 26. Mirror 26 reflects the light beam 90 degrees downward. The light beam passes through focusing ring 48 and is further narrowed by passing through focusing slit aperture 30. The light beam passes through photographic plate 22, photographic plate platform aperture 34, and base aperture 35. After the light travels through aperture 35, it impinges upon mirror 27 and is reflected 90 degrees. The light then travels onward to the detector unit 36 of the spectrophotometer. The detector unit output is received by a recorder (not shown) and recorded.

The photographic plate is moved beneath the light beam by photographic plate platform 15 so that the entire photographic plate may be scanned and the information thereon recorded. The transverse adjustment 18 may be motor driven rather than manually driven by turning transverse adjustment screw 19. The mirrors 24, 25, 26 and 27 may also be replaced by a curved optical tube utilizing the principles of fiberoptics as disclosed in the article "Fiber Optics," by N. S. Kapany in Scientific American, November 1960, Vol. 203, page 72. Fiber optics is a term used to describe light conductors of a special type which are made of bundles of very thin, flexible, glass or plastic fibers usually coated with a layer of glass of a different kind. The fiber bundles can be used to transport an optical image over a tortuous path.

In another embodiment of the present invention, two mirror arrangements may be employed. When two mirror arrangements are employed, the light beam can split into two beams. One of the light beams is directed through the photographic plate and the other light beam passes unimpeded through a reference plate to the detector. The detector then records the ratio of the two intensities, the ratio being indicative of the density of the image on the photographic plate. Such a "double-beam" embodiment enhances the accuracy of the intensity measurements.

It is believed that the invention has been sufficiently explained without any further details such as to enable those skilled in the art to understand the complete operation thereof. It is desired to point out that considerable variation is capable of being made without in any way departing from the spirit or the scope of the invention as defined in the claims appended hereinafter.

What is desired to be secured by Letter Patent in the United States is:

1. An apparatus for adapting a spectrophotometer containing a light source, monochromator, sample chamber, detector, and recorder to perform the function of a densitometer comprising, in combination:
   a. base means which rests upon the surface of said sample chamber of said spectrophotometer;
   b. means connected to said base means for directing a beam of light from said light source through a non-opaque sample, including:
      i. first mirror means connected to the bottom of said base means for reflecting said light beam upwardly from said sample chamber to second mirror means,
      ii. second mirror means connected to the top of said base means for reflecting said light beam reflected from said first mirror means to third mirror means,
      iii. a third mirror means connected to the top of said base means for reflecting said light beam reflected from said second mirror means to fourth mirror means, and
      iiii. fourth mirror means connected to the bottom of said base means, said fourth mirror means reflecting said light beam directly to said detector;

c. lense means connected to said base means for focusing said light beam prior to said light beam impinging upon said non-opaque sample, d. slit means connected to said base means, said slit means being located above said base means between said third mirror means and said fourth mirror means for narrowing said light beam prior to the impingement of said light beam upon said non-opaque sample;

e. platform means slidably attached to said base means for moving said non-opaque sample across said light beam, said platform means being located between said slit means and said fourth mirror means in the path of said light beam reflected from said third mirror means to said fourth mirror means, said platform means having means for receiving and holding said non-opaque sample;

f. means connected to said base means for moving said platform means across said light beam.

2. The apparatus of claim 1 wherein said base means comprises a metal plate having hole means therein for the passage of said light beam through said plate.

3. The apparatus of claim 1 wherein said first mirror means reflects said light beam upwardly through said hole means approximately 90°, said second mirror means reflects said light beam approximately 90° in approximately the same direction and approximately parallel to said light beam traveling from said light source, said third mirror means reflects said light beam approximately 90° downward, and said fourth mirror means reflects said light beam approximately 90° in the same direction and generally parallel to said light beam traveling from said light source.

4. The apparatus of claim 1 wherein said lense means is connected to the top of said base means between said second mirror means and said third mirror means for focusing said light beam prior to said light beam impinging upon said third mirror means.

5. The apparatus of claim 1 wherein said slit means is connected to the top of said base means.

6. The apparatus of claim 1 wherein said platform means includes a metal plate having hole means therein through which said light beam passes, transverse adjusting plate means for positioning said non-opaque sample transversely with respect to the direction of movement of said platform, and guide means attached to the bottom of said platform means for controlling the direction of movement of said platform across said base means.

7. The apparatus of claim 1 wherein said means for moving said platform means comprises an electric motor connected to said base means, rotatable, threaded shaft means connecting said electric motor to said guide means, said guide means having threads therein for engaging said screw means.

8. An apparatus for adapting a spectrophotometer containing a light source, monochromator, sample chamber, detector, and recorder to perform the function of a densitometer comprising, in combination:

a. base means which rests upon the surface of said sample chamber of said spectrophotometer;

b. means connected to said base means for directing a beam of light from said light source through a non-opaque sample, including:

i. first mirror means reflecting said light beam upwardly through said hole means approximately 90°, ii. second mirror means reflecting light beam approximately 90° in approximately the same direction and approximately parallel to said light beam traveling from said light source, iii. third mirror means reflecting said light beam approximately 90° downward, and iv. fourth mirror means reflecting said light beam approximately 90° in the same direction and generally parallel to said light beam traveling from said light source.

c. lense means connected to said base means for focusing said light beam prior to said light beam impinging upon said non-opaque sample, d. slit means connected to the top of said base means said slit means being located above said base means between said third mirror means and said fourth mirror means for narrowing said light beam prior to the impingement of said light beam upon said non-opaque sample, e. platform means slidably attached to said base means for moving said non-opaque sample across said light beam, said platform means being located between said slit means and said fourth mirror means in the path of said light beam reflected from said third mirror means to said fourth mirror means, said platform means having means for receiving and holding said non-opaque sample, f. means connected to said base means for moving said platform means comprising i. an electric motor connected to said base means, ii. rotatable, threaded shaft means connecting said electric motor to said guide means, and iii. said guide means having threads therein for engaging said screw means.

* * * * *